Figures 1, 2:
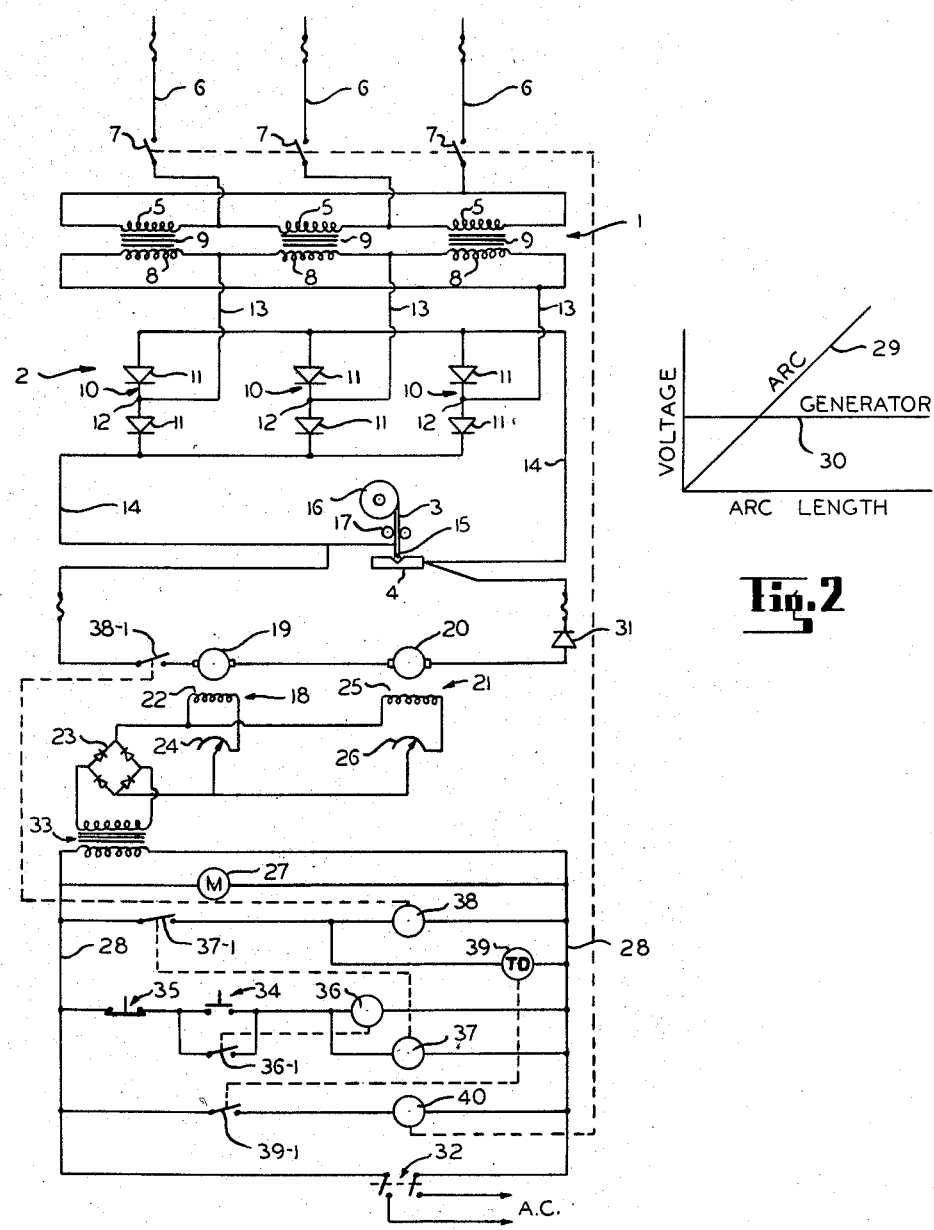

Oct. 21, 1958        H. S. LUND        2,857,546

VARIABLE ELECTRODE FEED FOR CONSUMABLE-ELECTRODE ARC WELDING

Filed April 5, 1957

INVENTOR.
HAROLD S. LUND
BY
ATTORNEYS

United States Patent Office 2,857,546
Patented Oct. 21, 1958

2,857,546

VARIABLE ELECTRODE FEED FOR CONSUMABLE-ELECTRODE ARC WELDING

Harold S. Lund, Milwaukee, Wis., assignor to A. O. Smith Corporation, Milwaukee, Wis., a corporation of New York Application April 5, 1957, Serial No. 651,001

5 Claims. (Cl. 314—69)

This invention relates to a variable electrode feed and particularly a variable feed responsive to changes in arc voltages in a consumable-electrode arc welding process employing high rates of electrode feed.

The present trend in arc welding is toward the use of small diameter consumable-electrodes and a high welding current density. Consequently, the rate at which the electrode is fed to the work has also increased. The best weld is obtained if the arc between the electrode and the work is maintained at a constant length. However, defects in the workpieces and momentary disturbances in the electrode feeding circuit, and the like, change the arc length. The arc voltage, which varies directly with the arc length, may be employed to change the rate of electrode feed and return the arc length to its predetermined optimum length.

One known electrode feed employs a series connected D. C. drive motor and D. C. bias generator connected across the arc. The D. C. motor is mechanically coupled to the electrode to continuously drive the electrode to the arc and the arc voltage is connected to energize the motor to drive the electrode toward the work. The output of the D. C. generator is connected to buck the arc voltage and thus tends to energize the motor in a reverse direction to drive the electrode away from the work. The generator output is less than the normal arc voltage and the rate at which the electrode is driven toward the work will vary in accordance with changes in the arc voltage.

Although this arc voltage control has given highly satisfactory results in previous arc welding processes, the arc sometimes is erratic in the newer processes using higher rates of feed. The drive motor cannot respond sufficiently fast to follow the changes in the arc voltage which arise with the high rates of electrode feed. Particularly is this true during conditions reaching or approaching short circuit relation of the electrode to the work. The motor is then energized to withdraw the electrode from the work. However, the welding current is so great that the electrode is rapidly burned back to increase the arc length. The motor is then energized to re-establish a higher electrode feed. Due to the inertia in the motor, the motor continues to slow down and the arc length is allowed to increase substantially past the normal arc length. Eventually, the motor begins to increase the rate of electrode feed but the energization has become such that the motor inertia drives the electrode again toward a short circuit condition. The time lag in motor response tends to establish a pumping or hunting action on the electrode which is alternately overdriven toward and away from the work. This results in alternately welded and non-welded areas.

In accordance with the present invention, the drive motor is continuously driven in a positive direction. When the arc voltage decreases to such an extent that the bias generator tends to drive the motor in a reverse direction, the motor is operatively disconnected from the energization circuit. Therefore, the motor only drives the electrode in a forward direction and never slows down such that it cannot re-establish a higher rate of electrode feed. During periods of short circuit condition, there is a relatively high current density which burns back the electrode and gives an inherent self-correcting arc. Therefore, the variable feed control is not necessary to correct this situation.

The present invention provides a simple and low cost apparatus for variably feeding the electrode in high-speed consumable-electrode arc welding.

The drawing illustrates the best mode presently contemplated of carrying out the present invention as described hereinafter.

In the drawing:

Figure 1 is a schematic circuit for a variable electrode feed circuit employing the present invention; and Fig. 2 is a diagrammatic illustration of the voltages controlling the electrode feed motor.

Referring to the drawing and particularly to Fig. 1, a transformer 1 is connected to the input of a bank of rectifiers 2. The output of bank of rectifiers 2 is connected to an electrode 3 and to a workpiece 4 which is to be welded.

The illustrated transformer is a three phase transformer having a delta connected primary winding 5 which is connected to three phase lines 6 through normally open contacts 7 in each line. A delta connected secondary 8 is magnetically coupled to the primary winding 5 by a suitable magnetic core structure 9. The transformer 1 changes the incoming voltage across line 6 to a suitable input voltage for the bank of rectifiers 2.

The bank of rectifiers 2 include three parallel branches 10 each having a pair of serially connected rectifying devices 11. Three A. C. input terminals 12 are located centrally of each branch 10 between the rectifying devices 11 and are connected to three output leads 13 from the delta connected secondary 8.

The rectifying devices are of any suitable variety, such as a silicon plate type of metallic rectifier, and are connected to provide similar current flow in each of the three parallel branches 10. The corresponding ends of the three parallel branches 10 are connected together and establish the direct current output leads 14. The output leads 14 are connected with the positive side to the electrode 3 and the negative side to the work 4 to establish an arc 15 therebetween.

The electrode 3 is of any suitable consumable material to provide a satisfactory weld of the workpiece 4. As the electrode 3 is consumable, it must be continuously driven toward the work 4 in order to maintain the arc 15. The electrode 3 is coiled on a reel support 16 and is drawn from the reel by friction drive rolls 17. A motor 18 has its armature 19 mechanically coupled in any suitable manner, not shown, to the drive rolls 17. The rate at which the armature 19 rotates determines the rate at which the drive rolls 17 drive the electrode 3 toward the work 4.

The armature 19 of motor 18 is connected across the arc 15 in series with an armature 20 of a direct current bias generator 21. An energizing field 22 for motor 18 is separately excited by a direct current from a bank of rectifiers 23. The field 22 is excited such that with the armature current established by the voltage across arc 15, the armature 19 rotates to drive the electrode 3 toward the work 4. A regulating rheostat 24 controls the field excitation and the final adjusted rate of electrode feed.

The bias generator 21 includes a separate field 25 which is also connected to the output of rectifiers 23 through a regulating rheostat 26. The armature 20 of generator 21 is driven by a constant speed, alternating current motor 27 which is mechanically coupled to the armature 20 by any suitable means, not shown, and which is energized from a pair of suitable alternating current control lines 28. The output of the generator 21 is therefore constant and tends to energize the motor 18 to withdraw the electrode 3 from the work 4.

The arc voltage and the generator voltage is generally shown in Fig. 2 as a function of the length of an arc. The arc voltage shown by line 29 increases with arc length while the generator voltage shown by line 30 remains at a constant value as determined by the setting of rheostat 26.

During the welding process, the voltage across the arc 15 tends to establish a current which energizes motor 18 to drive the electrode 3 in a positive direction. As the arc voltage varies, the voltage of the positive feed bias also varies. The bias generator 21 establishes a constant current output which energizes the motor 18 to drive the electrode 3 in a negative or electrode retracting direction. The energization of motor armature 19 of motor 18 is equal to the difference between these two opposing or bucking voltages. Normally, the arc voltage is greater than the generator voltage and the motor 18 continues to drive the electrode in a positive direction. As the electrode 3 and work 4 separate the voltage drop across the arc 15 increases as shown by line 29 in Fig. 2. This increased voltage drop increases the current through the motor armature 19 in a direction to increase the speed of the motor 18. The motor 18 will then drive the electrode toward the work 4 until the normal arc voltage is again established.

As the electrode and work draw closer together, the arc voltage decreases. As the arc length decreases, the arc voltage, as shown by line 29 in Fig. 2, decreases and approaches short circuit condition. The arc voltage may become less than the output voltage of the bias generator 21 as shown by the intersections of lines 29 and 30 in Fig. 2. The current through the armature 19 of the motor 18 would then normally reverse and drive the motor 18 in a reverse direction. With past welding processes the relatively slow rates of electrode feed permitted the reverse energization of the motor 18 without appreciable pumping or hunting of the electrode. With the advent of high-speed welding using high current densities, the inertia in the drive motor armature 19 and coupling, not shown, prevents sufficient response of the motor and adversely effects the welds, as previously discussed. This results in erratic action and periodically occurring short circuit condition.

In accordance with the present invention, a half-wave rectifier 31, preferably a dry plate rectifier, which is quite rugged and inexpensive and therefore adapted to commercial welding units, is serially connected with the motor and generator armatures 19 and 20. The rectifier 31 is connected with a polarity such that current flows only in the direction established by the voltage across the arc 15. Therefore, when the voltage output of the bias generator 21 is greater than the voltage across the arc 15, the series circuit including the motor and generator armatures 19 and 20 is operatively opened. Thus, the current in the motor armature 19 can never reverse and the electrode 3 is continuously driven toward the work 4. The automatic retraction or withdrawal of the electrode from the work 4 is unnecessary because as the electrode and work approach a short circuit condition, the welding current greatly increases and rapidly burns back the electrode 3 to re-establish an increased arc length. This is an inherent self-correction.

The set of single phase control lines 28 are connected by a double pole switch 32 to a suitable alternating current source, not shown, for operating motor 18 and generator 21. A matching transformer 33 is connected across the lines 28 and is connected to the input of rectifier 23 to establish the field currents for the motor 18 and the generator 21.

A normally open starting switch 34 and a normally closed stopping switch 35 are connected in series with a latch relay 36. The latch relay controls a set of contacts 36—1 which are connected in parallel with the starting switch 34 and maintain the circuit after the switch 34 is released. An actuating relay 37 is connected in parallel with the latch relay 36 and is also maintained energized through the latch contacts 36—1. The actuating relay 37 controls a set of contacts 37—1 which are connected in series with the parallel control relay 38 and time delay relay 39.

The control relay 38 controls a set of normally open contacts 38—1 in the motor armature circuit. When the relay 38 is energized, the contacts 38—1 close and complete the circuit connecting the motor and generator armature 19 and 20 across the arc 15.

The time delay relay 39 actuates a set of normally open contacts 39—1 which are connected in series with a line contactor relay 40. When the line contactor relay 40 is energized, the main contacts 7 close and establish the input to the transformer 1.

The operation of the illustrated embodiment of the invention is as follows:

The operator manually sets the regulating rheostats 24 and 26 to establish a respective excitation of the motor field 22 and the generator field 25 for an electrode feed rate to maintain a predetermined length of an arc 15, in the well-known manner. The operator then closes the switch 32 and depresses the start button switch 34 which actuates the latching relay 36 to close the contacts 36—1. The relays 36 and 38 are then energized as follows: one side of line 28, the normally closed stop switch 35, relay contacts 36—1, and then through parallel relays 36 and 37 to the other side of line 28. This circuit remains closed until the stop switch 35 is operated, either manually or automatically in response to a predetermined condition, to open this circuit and deenergize relay 36 to effect the release of contacts 36—1.

Relay 37 when energized closes the associated contacts 37—1 and completes the circuit to the paralleled control relay 38 and time delay relay 39.

The relay 38 closes the contacts 38—1 and completes the circuit of the motor armature 19 across the arc 15 whereby upon establishment of the arc 15 the motor 18 is energized to continuously drive the electrode 3 toward the work 4.

After a momentary delay, the time delay relay 39 closes the associated contacts 39—1 and energizes contactor relay 40 which closes the associated contacts 7. The input to rectifiers 2 is then complete and the rectifiers 2 establish an output adapted to establish and maintain arc 15 as long as the electrode 3 is maintained in suitably spaced relation to the work 4. The momentary time delay is inserted before the welding output is established to insure completion of the circuit for the drive motor 18 before establishment of the arc 15.

After the arc 15 is established, the motor armature 19 is energized by the difference between the voltage of the arc 15 and the voltage of the bias generator 21. Normally, the arc voltage is higher and the rectifier 31 allows armature current flow through the circuit as follows: starting with electrode 3, contacts 38—1, motor armature 19, generator armature 20, and then through the rectifier 31 to the work 4.

If the length of the arc 15 increases, the voltage across the arc 15 increases. This increased voltage increases the energization of the drive motor 18 which then increases the rate of feed of the electrode 3 to correct the arc length.

If the length of the arc decreases slightly, the voltage across the arc 15 decreases slightly. The slight decreased voltage also decreases the motor energization and consequently the rate of electrode feed. However, the arc voltage is still greater than the output from the bias generator 21 and the motor 18 continues to drive the electrode 3 toward the work 4 although at a reduced rate.

In the event the arc length substantially decreases, the voltage across the arc 15 may become less than the output voltage from the bias generator 21 as shown in Fig. 2. The voltage differential is then in a negative direction and attempts to energize the motor armature 19 to reverse its direction of rotation and consequently the direction of electrode feed. However, the rectifier 31 constitutes an open switch to reverse current flow and prevents any appreciable energization of the motor armature 19 in the reverse direction. Consequently, the motor 18 is de-energized and coasts until the arc length increases to establish and arc voltage greater than the generator voltage.

However, an increased welding current flows when the arc voltage decreases. When the arc voltage is less than the generator voltage, the welding current is so great that there is a very rapid burning back of the electrode. The arc voltage then increases above the generator voltage and again effects energization of the motor 18. Consequently, the de-energization of motor 18 is only for a short period. The inertia in the motor rotor maintains a practically constant speed such that there is no appreciable time delay in increasing the drive motor speed as the arc length increases.

The present invention has been applied to a consumable-electrode welding process employing a 1/16 inch diameter consumable electrode and an electrode feed rate of substantially 600 inches per minute. A suitable current input to the electrode was established to burn off the electrode and maintain an approximate arc length. The variable electrode feed compensated for the slight variation normal in arc welding. No appreciable hunting of the electrode was evident in the final weld.

Although a rectifying device is illustrated to effectively open the motor circuit, any other suitable means responsive to a voltage tending to drive the motor in a reverse direction may be employed to disconnect the motor. For example, electro-mechanical means responsive to the voltage differential between the generator and the arc may be employed. When the voltage differential drops to a predetermined level, the electro-mechanical means would operate to disconnect the drive motor. When the differential voltage again increases to a predetermined value, the motor would be connected in circuit.

Further, the action of the voltages from the arc and from the generator may be reversed. To do so, the effect of the arc voltage must be reversed. That is, as the arc voltage decreases it must tend to rapidly withdraw the electrode. As the arc voltage increases it must tend to more slowly withdraw the electrode. With such an arrangement, the polarity of the rectifier would be reversed to once again restrict motor energization to a positive electrode feed.

The present invention provides a simple and accurate variable-electrode feed for high-speed consumable-electrode arc welding.

Various modes of carrying out the invention are contemplated as being within the scope of the following claims particularly pointing out and distinctly claiming the subject matter which is regarded as the invention.

I claim:

1. In a variable electrode feed for consumable-electrode arc welding wherein the feed is responsive to the voltage differential between the arc voltage and a separate supplied voltage to maintain a constant arc length, drive means responsive to the voltage differential to normally drive the electrode toward the work, and means operatively connected in circuit with said voltages to prevent a reverse energization of said drive means and thereby maintain a positive drive of the electrode during normal arc welding.

2. In a variable electrode feed control for high-speed, consumable-electrode arc welding, a drive motor controlled by the differential of the arc voltage and a constant potential voltage to maintain a constant arc length, and a half wave rectifying means operatively connecting said voltages to said motor to prevent a current flow through the motor attempting to reverse the direction of electrode feed.

3. In a variable electrode feed for high speed, consumable-electrode arc welding, drive means to transfer the electrode to the arc, a direct current drive motor having an armature connected across the arc and mechanically coupled to the drive means to actuate the drive means, a bias generator having an armature serially connected with the motor armature and energizing the motor in a direction which tends to withdraw the electrode from the work, said generator having a predetermined output below the normal arc voltage, and means operatively connected with said armature circuit and responsive to a predetermined voltage differential to effectively open the armature circuit to current flow tending to operate the motor to retract the electrode from the arc.

4. A variable electrode feed for high-speed, consumable-electrode arc welding, drive means adapted to operatively engage the electrode and transport the electrode to the arc, a direct current motor having an armature connected across the arc and energized by the arc voltage to drive the electrode toward the arc, a direct current generator having an armature serially connected in a control circuit with said motor armature and said arc, said generator having a voltage polarity opposite said arc voltage to bias said motor in a direction which tends to withdraw the electrode from the arc and having a constant output below the normal arc voltage, and a rectifier serially connected in said control circuit to conduct appreciable current only in the current direction established by said arc voltage.

5. In a variable electrode feed for high-speed, consumable-electrode arc welding wherein an arc is established between a substantially 1/16 inch diameter electrode and a workpiece with the electrode being rapidly driven toward the arc at a rate of the magnitude of 600 inches per minute, drive rolls engaging the electrode to drive the electrode to the arc, a direct current motor having an armature connected across the arc and having a field energized to drive the electrode toward the arc, a direct current generator having an armature serially connected with said motor armature and said arc voltage and having a voltage polarity opposite the polarity of the arc voltage, said generator output being constant and less than the normal arc voltage, and a rectifier serially connected with said armatures with a polarity permitting appreciable current flow in a direction established by said arc voltage and preventing apreciable current flow in the direction established by the generator voltage.

No references cited.